United States Patent Office 3,525,775
Patented Aug. 25, 1970

3,525,775
CATALYTIC XYLENE ISOMERIZATION PROCESS AND CATALYST THEREFOR
Anthony P. Bolton, Amherst, and Mohammed A. Lanewala and Samuel W. Donley, Buffalo, N.Y., assignors to Union Carbide Corporation, a corporation of New York
No Drawing. Filed Mar. 29, 1968, Ser. No. 717,424
Int. Cl. C07c 5/24, 15/10
U.S. Cl. 260—668                        8 Claims

ABSTRACT OF THE DISCLOSURE

The catalytic isomerization of non-equilibrium mixtures of xylenes is accomplished using a zeolitic molecular sieve of low sodium cation content and preferably having a substantial trivalent metal cation content, which zeolite has deposited thereon a hydrocarbonaceous coke in an amount of from about 5 to about 20 weight percent.

---

The present invention relates in general to the isomerization of alkyl substituted benzenes and more particularly to the isomerization of non-equilibrium mixtures of o-, m- and p-xylenes, especially those mixtures with less than thermodynamic equilibrium content of p-xylene, using a highly selective zeolitic molecular sieve catalyst composition.

Xylene (dimethyl benzene) comprises three structural isomers, i.e., the ortho, meta, and para forms, which are also designated as 1,2, dimethyl-benzene, 1,3 dimethylbenzene, and 1,4 dimethylbenzene, respectively. Ethylbenzene is another isomer of xylene having the same chemical empirical formula, namely $C_8H_{10}$, but is not one of the structural isomers.

The rapidly increasing demand for xylene structural isomers as chemical intermediates in many large-volume industrial applications has necessitated improved processes for their production and recovery. The demand for para-xylene, which is used in the manufacture of dimethyl-terephthalate and of terephthalic acid for polyester fibers and films, is increasing at a faster rate than for the ortho and meta isomers.

Nearly all of the xylene produced at present is recovered by distillation or aromatics extraction from the product stream in the catalytic reforming of naphtha. Less than 2 percent of the total xylene output comes from destructive distillation of coal. The composition of mixed xylenes varies with the source, but because of thermodynamic equilibria, it is always richer in the least valuable meta-isomer. The $C_8$ aromatics fraction usually contains about 40–55% m-xylene and 15–20% each of o-xylene, p-xylene, and ethylbenzene.

Because of the closeness in the boiling points of the xylenes, the xylene isomers are very difficult to separate. However, with very efficient distillation columns, ortho-xylene and ethylbenzene each are separable from mixed $C_8$ aromatic streams. Separation of the remaining para- and meta-xylene isomers is virtually impossible by distillation. On the other hand, because of the 100° F. higher melting point of p-xylene crystals, it can be separated by fractional crystallization or by clathration in which small amounts of the para-isomers are tied up and removed.

Alternatively, para-xylene can be separated directly from the mixed $C_8$ aromatic streams or from a stream of the structural isomers by crystallization.

Only about 0.1 lb. of para-xylene is commercially recovered from one pound of a mixed xylene feed and this is insufficient to meet increasing demands. Therefore, processes are desired for increasing the quantity of the desired isomers by isomerization of the less desired isomers.

Processes for the isomerization of alkyl-substituted aromatics have been known for many years. In general, ease of ring positional isomerization decreases as the size of the alkyl substituent decreases. Thus, xylenes are isomerized with most difficulty, and indeed migration rate constants for methyl groups are approximately 10 times less than for similar ethylsubstituted aromatics. (Olah, chapter 24, vol. II, part 2, page 1061.) Even with very strong, concentrated mineral acid catalysts, xylenes isomerize at about 100° C., whereas ethyl groups migrate at room temperatures and isopropyl groups at −80° C. (Olah, vol. I, page 69). The extent of isomerization is governed by thermodynamics and equilibrium isomer distributions can be achieved with active catalysts, starting from any of the xylene isomers or mixtures not at equilibrium compositions. Temperature has but little effect on equilibrium compositions. Calculated equilibrium product distributions in mole percent are:

| Isomer | 300° K. | 600° K. | 900° K. |
|---|---|---|---|
| Ortho | 16.4 | 22.9 | 26.6 |
| Meta | 59.8 | 53.2 | 50.6 |
| Para | 23.8 | 23.8 | 22.8 |

Conventional catalysts of the mineral acid or platinum on halide activated alumina also catalyze the disproportionation (also termed transalkylation) of xylenes, to toluene and trimethyl-substituted products. These side reactions occur under isomerization conditions and result in loss of valuable reactants and with attendant difficulties in subsequent purification schemes. The disproportionation reactions are also equilibrium controlled and the equilibrium concentrations have been calculated in mole percent as:

| Component | 300° K. | 600° K. | 900° K. |
|---|---|---|---|
| Xylenes | 45.5 | 46.6 | 46.5 |
| Toluene plus trimethylbenzenes | 54.5 | 53.4 | 53.5 |

Prior known catalysts for xylene isomerization include strong mineral acids such as concentrated sulfuric acid, concentrated HF, and Lewis acids such as $BF_3$, HCl-promoted $AlCl_3$, and $ZnCl_2$. All of these catalysts are highly corrosive and form strong complexes, particularly with meta-substituted alkyl aromatics, which results in the preferential formation of this isomer in greater than equilibrium amounts. These acid catalysts are also difficult to remove from the reaction products. Amorphous silica-alumina compositions such as those employed in cracking reactions have been proposed for xylene isomerization. This type of catalyst with or without halide promoters and activators requires reaction temperatures as high as 515° C. and is rapidly deactivated by coke formation accompanying simultaneous cracking reactions. At this temperature, the alkyl groups can sub-divide or grow with the production of ethyl and/or higher alkyl-groups. It is desirable to eliminate this side reaction during isomerization. Commercial isomerization processes generally employ noble-metal on alumina or silica-alumina supports promoted with halide activators as catalysts. U.S. Pat. No. 3,113,979 discloses the use of this type of catalyst which requires the presence of hydrogen in the reaction sphere to prevent rapid deactivating coke deposition. As a result, reaction temperatures must be greater than 800° F., preferably greater than 850° F. to limit hydrogenation of the aromatic feed and products to naphthenic compounds. At these high reaction temperatures, ethylbenzenes are produced from xylene feeds along with some dealkylation to benzene and methane, ethane and higher paraffinic hydrocarbons.

Therefore, it is not especially surprising that when isomerizing xylene (causing migration of methyl groups to different ring positions) that disproportionation (migration of methyl groups from one ring to another ring) also occurs.

The improved xylene isomerization process of the present invention employs a novel catalyst which comprises a crystalline zeolitic molecular sieve having a pore size large enough to absorb benzene, a silica to alumina ratio of at least 2.2 and preferably greater than 3 and an alkali metal cation content less than 10 equivalent percent, said zeolitic molecular sieve having a deposit thereon of a hydrocarbonaceous coke in an amount of from about 5 to about 20 weight percent based on the weight of the zeolite in its dehydrated state, and said zeolite having a residual volatile content exclusive of the coke deposit such that when heated to 1000° C. for ½ hour a weight loss of not greater than 2.5 percent is incurred.

Especially suitable for use as starting materials in the preparation of the catalysts of this invention are zeolite X (U.S.P. 2,882,244); zeolite Y (U.S.P. 3,130,007); zeolite L (U.S.P. 3,216,789); zeolite TMA-Ω (U.S. application Ser. No. 655,318 filed July 24, 1967); and natural or synthetic mordenite which has been acid washed.

Preferably the zeolite catalysts contain some polyvalent, i.e., di, tri or tetravalent metal cations, particularly trivalent metal cations. The introduction of these metal cations into the zeolite crystal structure not only tends to have a stabilizing effect on the crystal lattice but also serves as a convenient means of lowering the alkali metal cation content to the desired level of less than 10 equivalent percent. Divalent cations include those of Group IIa such as calcium and magnesium and Group VII such as manganese. Tetravalent cations include $Th^{+4}$ and $Ce^{+4}$. The preferred trivalent cations include aluminum and the rare earth cations lanthanum, cerium, praseodymium, neodymium, samarium, gadolinium, europium, terbium, dysprosium, holmium, erbium, thulium, ytterbium, lutetium, and the rare earth mixture known commonly as didymium. When divalent cations are employed to replace alkali metal cations, it is advantageous to also include trivalent cations even in major proportion with respect to the divalent cations. Conventional aqueous solution ion exchange techniques are satisfactory means for introducing the polyvalent cations.

In addition to, or in some instances instead of, polyvalent cation exchange, it is possible to lower the alkali metal cation content by ion exchanging therefor cations which are thermally unstable or which are removable by thermal means such as ammonium, alkyl ammonium or hydrogen.

The extent to which the zeolite molecular sieve can contain thermally removable or unstable cations when the catalyst is ready for activation is related to the silica-to-alumina ratio of the sieve. When this ratio is about 2.5, the sieve can have no more than 30 equivalent percent of its exchangeable cation content as thermally removable or unstable cations while at a ratio of 4 and higher the content can be substantially 100%. This relationship will provide a retention of a desirable minimum of at least 75% of the crystallinity of the zeolitic molecular sieve during thermal activation to the desired volatile content, when measured at 1000° C., of 2.5 weight percent or less. The percent retention of crystallinity may be determined as the degree of retention of oxygen adsorption capacity of the sieve after thermal activation to a volatile content of 2.5 wt. percent or less at 1000° C. for ½ hour compared to the oxygen capacity upon thermal activation at 400° C. The oxygen adsorption test may be made at 100 mm. $O_2$ pressure at −183° C. after heating at 400° C. at five microns Hg vacuum for 16 hours.

The cation exchange can be done with either or both of the polyvalent metal cations and the thermally unstable cations and when both are employed the order of exchange is not critical. However, when the zeolite has a silica-to-alumina mole ratio in its structure of greater than 3, as in zeolite Y, best results are obtained when the sodium cation is replaced first by ammonium to remove the sodium to the desired level and then the polyvalent metal can be introduced by cation exchange to the desired level.

Activation of the ion exchanged zeolite having its sodium cation content reduced to less than 10 equivalent percent is accomplished by heating at temperatures of from about 400° C. to 750° C. for a period of time, normally from about ¼ to about 12 hours until the weight loss (LOI) tested at 1000° C. for ½ hour is not greater than 2.5 weight percent. This LOI is concerned only with the zeolite crystals and does not include any coke deposit or binder material which may be present in the final catalyst composition. The activation temperature and the time are inter-related with the cation composition of the zeolite. For example, a zeolite containing substantially only divalent and monovalent metal cations can be activated to the necessary LOI value at the relatively modest temperature of about 400° C. for 1 hour using a dry air purge. On the other hand, a zeolite having a silica to alumina ratio of above 4 and containing hydrogen, decomposable cations and/or trivalent metal cations will require a temperature of at least 450° C. for ¼ hour to attain the necessary degree of activation. Regardless of the cation make-up of a given zeolite the optimum activation temperature and time can readily be arrived at by routine thermal gravimetric analysis.

The zeolitic molecular sieves prepared and activated as hereinbefore described are highly active for isomerization and disproportionation of xylene. One totally unexpected discovery was that isomerization reaction becomes selectively favored over the disproportionation reaction when the catalyst becomes loaded with carbonaceous deposits of from about 5 wt. percent to about 20 wt. percent. The manner in which the catalyst becomes coked is not critical nor is there believed to be any criticality in the type of coke, that is, it may be in the form of high molecular weight hydrocarbon molecules which are not desorbed under the isomerization process conditions or it may be a more carbon rich coke resulting from thermal stabilization of polymeric hydrocarbons.

One excellent method of coking the catalyst involves contacting the catalyst, in its activated state of less than 2.5 wt. percent LOI, with an easily polymerizable unsaturated hydrocarbon. Examples of easily polymerizable hydrocarbons are styrene, isobutylene, butadiene, and methyl acetylene. The contact may be under adsorption conditions followed by heating to effect polymerization and coking. This was done effectively by slurrying the activated catalyst in cyclohexane liquid and slowly adding liquid monomeric styrene at room temperature. The catalyst adsorbs the styrene substantially quantitatively. After separating the catalyst from the cyclohexane, it was heated in a nitrogen atmosphere to 500° C. to polymerize the styrene and stabilize the coke.

Alternatively, the contact may be under polymerization conditions as exemplified by passing a stream of nitrogen gas upward through a bed of activated catalyst in a fluidized state and heated to 100 to 200° C. Isobutylene vapors are added to the nitrogen stream slowly so as to not cause rapid temperature rises in the catalyst bed until the amount of isobutylene added is about 5 and preferably 10 to 15 wt. percent of the catalyst. The isobutylene is simultaneously adsorbed and polymerized. A stable coke is then made by raising the temperature to 450–600° C.

Another highly effective coking method is that wherein the catalyst is used in a hydrocarbon conversion process which inherently causes carbonaceous residues to form on the catalyst. As an example, this was done by employing an active catalyst for the disproportionation of toluene to benzene and xylene at 700° F., 450 p.s.i. pressure, hydrogen: hydrocarbon mole ratio 3/1 and WHSV (weight hourly space velocity) of 4 pounds per hour per pound of catalyst until the disproportionation reaction essentially ceased. This catalyst was found to have accumulated about 20 wt. percent coke as carbon. Even at this high coke level, the catalyst had excellent activity in the xylene isomerization process.

The zeolitic molecular sieve catalyst is preferably agglomerated for use in the fixed bed, moving bed or fluid bed xylene isomerization process. It is known to produce the preferred zeolites as fine powders and certain processes are known for synthesizing them in various shapes. Aglomeration of the powder form may include active and/or inactive binder and/or diluent materials as are well known or may be by tableting without added diluent or binder.

In its broadest aspect, the xylene isomerization process involves providing a feed stock containing xylene with other than thermodynamic equilibrium isomer content and a carrier gas in the proportion of at least 100 volumes of carrier gas per liquid volume of feed stock. The carrier gas and feedstock are combined and contacted with a zeolitic molecular sieve catalyst within certain process condition ranges, as discussed hereinafter.

The relevant process variables are temperature, pressure and the weight hourly space velocity (WHSV) of the hydrocarbon feed through the catalyst bed.

Since it is desirable to maintain the xylenes in the vapor state in contact with the catalyst, the temperature and pressure are to an extent inter-related. In general, temperatures within the range of 500° F. and 800° F. are suitable, but preferably are within the range of 550° F. to 750° F. Critical temperatures of the various xylene structural isomers range from 652° F. to 675° F. The corresponding critical pressures are 35 to 37 atmospheres. Accordingly, operating pressures within the range of from atmospheric to 750 p.s.i. generally insure that the xylenes are in the vapor state with pressures of about 300±150 p.s.i. being preferred.

Within the limits of the other process variables as defined herein, increased isomerization is obtained at the lowest xylene feed WHSV values. Raising the space velocity results in the xylene isomer distribution moving progressively farther away from the equilibrium distribution, but is accompanied by an almost directly proportional increase in the rate of production of ortho or p-xylene. Thus, the WHSV is not critical and can advantageously be within the range of about 1 to about 25.

A carrier gas for the xylene feed is ordinarily employed. As a carrier gas, hydrogen is very effective since it is essentially not adsorbed by the molecular sieve catalyst at the isomerization temperatures used. In this process the hydrogen is unnecessary as a reactant to reduce coke build-up and accordingly the catalyst preferably does not include a highly active hydrogenation component such as elemental nickel palladium or platinum metal of Group VIII. Other and inert carrier gases include nitrogen, methane, helium, argon and mixtures thereof. The mole ratio of carrier gas to the xylene feed is not narrowly critical, but a mole ratio of about 5 to 10 is preferred.

The effluent product from the reactor is subjected to separation in any conventional manner to disengage the carrier gas, which may be recycled, from the aromatics fraction and then to separate and recover the more desired para-isomer and additionally, if desired, the ortho isomer, from the least desired meta-isomer and the disproportionation product containing principally toluene and trimethyl benzene with lesser amounts of benzene and higher polymethyl benzenes. Fractional distillation can effectively separate the mixed xylenes from the lower boiling toluene and benzene fraction and the higher boiling tri and higher methyl benzene fraction.

The para-isomer is then recovered from the mixed xylenes by fractional crystallization and, if desired, the ortho and meta-isomers are separated by fractional distillation.

In one preferred form of the isomerization process the toluene-benzene fraction, the tri and higher methyl benzene fraction, the meta-isomer fraction plus, optionally, the ortho-isomer fraction are recycled and combined with the feedstock. This preferred process greatly improves the efficiency of utilization of the meta-xylene in the production of the more valuable isomer.

The invention is illustrated by reference to the following examples:

EXAMPLE 1

Preparation of lanthanum exchanged Type X

Sodium zeolite Type X having a $SiO_2/Al_2O_3$ ratio of 2.5 was subjected to three batch-type aqueous cation exchange treatments under reflux conditions, each with a four-fold equivalent quantity of lanthanum chloride. The sodium cation content of the product was 4 equivalent percent and the lanthanum was 96. Activation by heating at 625°–650° C. produces a catalyst with an LOI of about 2 wt. percent.

EXAMPLE 2

Preparation of highly ammonium-exchanged Type Y

Sodium zeolite Type Y having a $SiO_2/Al_2O_3$ ratio of 4.8 was converted to an ammonium exchanged Type Y with a sodium-to-aluminum atom ratio of .04 by first conducting a hot (about 95° C.) batch type aqueous cation exchange treatment using approximately one equivalent of ammonium chloride per cation equivalent of zeolite. The exchanged zeolite was then transferred to a plate and frame filter and was contacted with a hot aqueous solution containing a total of eleven equivalents of ammonium chloride. At this point the residual sodium was about 12% of the zeolite equivalence. A further hot batchwise exchange with a 6 fold amount of ammonium chloride was followed by a flow-type exchange in the filter using about 30 equivalents of ammonium chloride, then was followed by washing to a chloride free state.

EXAMPLE 3

Preparation of 60% rare earth, low sodium, Type Y catalyst

Ammonium exchanged Type Y was batch-wise hot aqueous cation exchanged in a single treatment with about ¾ equivalent of didymium chloride and then washed yielding a product composition containing about 60 cation equivalent percent didymium, 4 cation percent sodium and 34 cation equivalents ammonium. The dried product from an oven at about 100° C., with about a 16% LOI, was tableted with about ½% graphite lubricant, then crushed, combined with one percent graphite lubricant, and retableted to ⅛" dia. x ⅛" long. These tablets were then fired in a furnace at 625–650° C. to activate the catalyst.

EXAMPLE 4

Preparation of 46 percent rare earth, low sodium, Type Y catalyst

This catalyst was prepared in the same manner as that in Example 3 except that the didymium exchange was done with about 0.46 equivalent. The analysis showed 46 cation equivalent percent didymium, 5 sodium and 47 ammonium.

EXAMPLE 5

Preparation of 95 percent rare earth, low sodium, Type Y catalyst

This catalyst was prepared the same as in Example 3 except that more intensive didymium exchange was required. A 500 gram (solids) quantity of the highly ammonium-exchanged Type Y was slurried in 3 liters of distilled water and 807 grams of didymium chloride was added. The mixture was stirred and heated at reflux for 4 hours, filtered and washed. A repeat exchange gave a product in which the rare earth sodium and ammonium cation equivalent were .95, .01 and .02, respectively.

EXAMPLE 6

43 percent manganese, low sodium product from zeolite Type Y

A quantity of a highly ammonium-exchanged Type Y as made in Example 1 containing 250 grams (fired solids basis) was slurried in 3 liters of distilled water and 90.4 grams of manganese chloride tetrahydrate was added. While agitating, the mixture was heated under reflux for 4 hours, filtered, washed and dried at 110° C. At this point the product contained 0.43 MnO, 0.47 $(NH_4)_2O$, and 0.05 $Na_2O$ per $Al_2O_3$. An active xylene isomerization catalyst is obtained by tableting and heating as in Example 3.

EXAMPLE 7

68 percent magnesium, low sodium product from Type Y

To the same amount of ammonium exchanged starting material slurried as in Example 6, was added 161 grams of $MgSO_4$. After heating under reflux for 4 hours, filtering, washing, and drying, the procedure was repeated. The product contained 0.68 MgO and 0.06 $Na_2O$ per $Al_2O_3$.

EXAMPLE 8

In typical operations of the process of this invention, the following procedures were carried out:

(a) A cylindrical catalytic reactor having an inside diameter of 1 inch and a length of 30 inches was loaded with 100 cc. of the activated and coked zeolite catalyst in the form of ⅛" x ⅛" pellets. The reactor was surrounded by one-inch thick aluminum blocks heated by means of a heating mantle. The catalyst-containing reactor was purged with dry nitrogen to remove air, then purged with pure dry hydrogen and then the entire reactor system was pressurized with $H_2$ to 400 p.s.i. The reactor temperature was then brought to operating temperature and the hydrogen flow was adjusted with respect to the desired xylene WHSV and hydrogen to hydrocarbon ratio. Operating conditions and catalyst compositions were varied to demonstrate the effects of each variable on the product xylene mixture.

(b) A catalyst composition prepared from zeolite Y having a $SiO_2/Al_2O_3$ ratio of 4.8, a sodium cation content of 5 equivalent percent, a didymium cation content of 46 equivalent percent with the remainder of the cation content being ammonium cations. The cation exchanged zeolite was heated at 650° C. for 2 hours using a dry air purge. A coke deposit of about 11 weight percent is placed on the catalyst by contacting with toluene at 700° F. and 450 p.s.i. This catalyst is tested for activity in the reactor at various temperatures using a xylene feed containing 95 percent m-xylene, a hydrogen to xylene mole ratio of 5, a WHSV of 1 and a pressure of 400 p.s.i. The results versus the operating temperature are in Table I below:

TABLE I

| Temperature ° F.: | Percent approach to p-xylene isomerization equilibrium |
|---|---|
| 475 | 12.6 |
| 550 | 39.6 |
| 575 | 76.4 |
| 700 | 91.5 |
| 775 | 94.6 |

(c) The effect of weight hourly space velocity (xylene feed stream) on the efficiency of the process is demonstrated using the same apparatus and procedure as in part (a) and other than the WHSV the same conditions and coked catalyst as in part (b) except that the didymium cation content was 60 equivalent percent instead of 46 and the ammonium cation content prior to calcination was proportionately lower. The results are shown in Table II below:

TABLE II
[Temp. 650° F.]

| WHSV | Percent approach to p-xylene isomerization equilibrium | Weight of p-xylene per wgt. of cat. per hr. |
|---|---|---|
| 1 | 91.6 | 0.19 |
| 2 | 72.6 | 0.33 |
| 5 | 70.2 | 0.84 |

(d) Using the same coked catalyst as in part (c) above and the same apparatus and procedure as in part (a), the effect of pressure is demonstrated using a WHSV of 1, a temperature of 625° F., and 95% m-xylene feed and a $H_2$:xylene ratio of 5. The results are shown in Table III below:

TABLE III

| Pressure (p.s.i.) | Percent approach to p-xylene isomerization equilibrium | Wgt. of p-xylene per wgt. cat. per hr. |
|---|---|---|
| 100 | 56.3 | 0.14 |
| 200 | 67.2 | 0.17 |
| 400 | 80.0 | 0.18 |

(e) Three samples of the zeolite of part (b) above were coked with different quantities of hydrocarbonaceous coke from different sources. In two of the samples the coke deposit was formed by adsorbing styrene into the internal cavities of the zeolite and polymerizing same thermally. In the other sample the catalyst was employed first as a disproportionation catalyst for the conversion of a toluene feed to benzene and xylene. The coke deposit produced resulted from the normal cracking, polymerization and ultimate hydrocarbon degradation conventionally encountered in catalystic hydrocarbon conversion processes. The three coked samples were compared with an uncoked control sample for xylene isomerization using a temperature of 575° C., a 95% m-xylene feed, WHSV of 1, $H_2$:xylene ratio of 5 and a pressure of 400 p.s.i. The results are shown below:

TABLE IV

| Method of coking | Coke loading [1] | Rate of p-xylene production [2] | Selectivity [3] |
|---|---|---|---|
| None | 0 | 0.11 | 54 |
| Styrene | 5 | 0.11 | 58 |
| Do | 17 | 0.12 | 79 |
| Toluene | 18 | 0.12 | 81 |

[1] Weight percent carbon on catalyst.
[2] Weight of p-xylene produced per weight of catalyst per hour.
[3] $\frac{\text{Xylene isomerized} \times 100}{\text{Xylene converted (total)}}$

What is claimed is:

1. Process for catalytically isomerizing a xylene mixture containing a non-equilibrium quantity of meta xylene which comprises contacting said xylene mixture with an alumino-silicate catalyst under isomerization conditions, said catalyst comprising a crystalline zeolitic molecular sieve having a silica to alumina molar ratio of at least 2.2, a pore size large enough to adsorb benzene, and an alkali metal cation content not greater than 10 equivalent percent, said zeolitic molecular sieve having a deposit thereon of a hydrocarbonaceous coke in an amount of from about 5 to about 20 weight percent based on the weight of the zeolite in a dehydrated state, and said zeolite having a residual volatile content exclusive of the coke deposit such that when heated to 1000° C. for ½ hour a weight loss of not greater than 2.5 percent is incurred.

2. Process according to claim 1 in which the contact of the xylene mixture with the zeolitic molecular sieve catalyst is at a temperature within the range of about 500° F. to about 800° F. and at a pressure of from atmospheric to 750 p.s.i.

3. Process according to claim 2 wherein the temperature is from about 550° F. to 750° F. and the pressure is from about 200 to 400 p.s.i.

4. A catalyst composition suitable for isomerizing a non-equilibrium mixture of xylenes which comprises a zeolitic molecular sieve having at least about 75 percent crystallinity, having a pore size large enough to adsorb benzene, a silica to alumina molar ratio of at least 2.2 and an alkali metal cation content not greater than 10 equivalent percent, said zeolitic molecular sieve having a deposit thereon of a hydrocarbonaceous coke in an amount of from about 5 to about 20 weight percent based on the weight of the zeolite in a dehydrated state, and said zeolite having a residual volatile content exclusive of the coke deposit such that when heated to 1000° C. for ½ hour a weight loss of not greater than 2.5 percent is incurred.

5. The catalyst composition according to claim 4 wherein the zeolitic molecular sieve has a silica to alumina molar ratio greater than 3 and at least some of the cations thereof are trivalent metal cations.

6. The catalyst composition according to claim 5 wherein at least some of the trivalent metal cations are rare earth.

7. The catalyst composition according to claim 5 wherein the major proportion of the metal cations present other than alkali metal cations are trivalent metal cations.

8. Process for preparing a catalyst composition which comprises heating a zeolitic molecular sieve having a pore size large enough to adsorb benzene, a silica to alumina ratio of greater than 3 and an alkali metal cation content of not greater than 10 equivalent percent for a sufficient period of time such that said zeolitic molecular sieve retains at least about 75 percent crystallinity and contains a residual volatile content not greater than 2.5 weight percent when heated at 1000° C. for ½ hour, and thereafter depositing on said zeolitic molecular sieve a hydrocarbonaceous coke in the amount of from about 5 to about 20 weight percent based on the weight of the dehydrated zeolitic molecular sieve.

References Cited

UNITED STATES PATENTS

| | | | |
|---|---|---|---|
| 3,394,075 | 7/1968 | Smith | 208—46 |
| 3,424,671 | 1/1969 | Kay | 208—46 |

DELBERT E. GANTZ, Primary Examiner

C. R. DAVIS, Assistant Examiner

U.S. Cl. X.R.

252—455